US010518620B2

(12) United States Patent
Yamafuji et al.

(10) Patent No.: US 10,518,620 B2
(45) Date of Patent: Dec. 31, 2019

(54) FUEL CELL MOUNTING STRUCTURE

(71) Applicant: TOYOTA JIDOSHA KABUSHIKI KAISHA, Toyota-shi, Aichi-ken (JP)

(72) Inventors: Takahiro Yamafuji, Nagoya (JP); Fumihiro Abukawa, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/798,549

(22) Filed: Oct. 31, 2017

(65) Prior Publication Data

US 2018/0178641 A1 Jun. 28, 2018

(30) Foreign Application Priority Data

Dec. 26, 2016 (JP) .................. 2016-251928

(51) Int. Cl.
*B60K 1/04* (2019.01)
*H01M 8/2465* (2016.01)
(Continued)

(52) U.S. Cl.
CPC .............. *B60K 1/04* (2013.01); *B60L 3/0007* (2013.01); *B60L 50/71* (2019.02); *B60L 50/72* (2019.02);
(Continued)

(58) Field of Classification Search
CPC .............. B60K 1/04; B60K 2001/0411; B60K 5/1216; B60K 5/1275; B60L 11/1881;
(Continued)

(56) References Cited

U.S. PATENT DOCUMENTS 5,740,876 A * 4/1998 Shimose .............. B60K 5/1216
180/232
5,992,555 A * 11/1999 Sakamoto ............ B60K 5/1216
180/232
(Continued)

FOREIGN PATENT DOCUMENTS

DE           2455790 A1 *  6/1976 ........... B60K 5/1275
JP     2003-326983 A    11/2003
(Continued)

*Primary Examiner* — James A Shriver, II
*Assistant Examiner* — Steve Clemmons
(74) *Attorney, Agent, or Firm* — Oblon, McClelland, Maier & Neustadt, L.L.P.

(57) ABSTRACT

There is provided a fuel cell mounting structure including: a pair of left and right vibration-proofing members that are provided due to front side joining portions and rear side joining portions being mounted to suspension members; and a fuel cell that is supported at least by the pair of left and right vibration-proofing members, and is disposed at vehicle body upper sides of the suspension members, wherein one of the front side joining portions and the rear side joining portions are supported so as to be rotatable with a vehicle transverse direction being an axis of rotation, and another of the front side joining portions and the rear side joining portions are structured so as to break away from the suspension members, due to weak portions breaking at a time when load is inputted to the fuel cell from a vehicle body longitudinal direction.

8 Claims, 11 Drawing Sheets

(51) Int. Cl.
    *H01M 8/247* (2016.01)
    *B60L 3/00* (2019.01)
    *B60L 50/72* (2019.01)
    *B60L 50/71* (2019.01)

(52) U.S. Cl.
    CPC ......... *H01M 8/247* (2013.01); *H01M 8/2465* (2013.01); *B60K 2001/0411* (2013.01); *B60Y 2306/01* (2013.01); *B60Y 2400/48* (2013.01); *H01M 2250/20* (2013.01); *Y02T 10/7005* (2013.01); *Y02T 90/32* (2013.01)

(58) Field of Classification Search
    CPC ... B60L 11/1883; B62D 21/15; B62D 21/152; B62D 21/155; H01M 8/2454; H01M 8/247; H01M 2250/20; B60Y 2306/01; B60Y 2400/48; B60Y 2400/202
    See application file for complete search history.

(56) References Cited

U.S. PATENT DOCUMENTS

| | | | | |
|---|---|---|---|---|
| 6,120,011 | A * | 9/2000 | Maeno | B60K 5/1291 267/140 |
| 7,040,446 | B2 * | 5/2006 | Anzai | B60K 5/1275 180/234 |
| 7,393,016 | B2 * | 7/2008 | Mitsui | B62D 25/08 180/232 |
| 7,886,861 | B2 * | 2/2011 | Nozaki | B60K 1/00 180/232 |
| 8,459,399 | B2 * | 6/2013 | Ohashi | B60K 1/04 180/312 |
| 9,079,508 | B2 * | 7/2015 | Naito | B60K 1/04 |
| 9,371,009 | B2 * | 6/2016 | Ishikawa | B62D 21/15 |
| 9,616,931 | B2 * | 4/2017 | Sangha | B62D 21/155 |
| 9,963,171 | B2 * | 5/2018 | Nagaosa | H01M 8/04201 |
| 2004/0101745 | A1 * | 5/2004 | Kawasaki | B60K 1/04 429/96 |
| 2007/0051549 | A1 * | 3/2007 | Fukuda | B60K 1/00 180/232 |
| 2008/0142289 | A1 * | 6/2008 | Yang | B60K 1/04 180/299 |
| 2009/0197142 | A1 * | 8/2009 | Niimi | H01M 8/0276 429/414 |
| 2012/0015257 | A1 * | 1/2012 | Arisawa | B60K 1/04 429/400 |
| 2012/0028135 | A1 * | 2/2012 | Ohashi | B62D 25/20 429/400 |
| 2012/0279792 | A1 * | 11/2012 | Katano | B60L 11/1892 180/65.31 |
| 2013/0126255 | A1 * | 5/2013 | Saeki | B60K 1/04 180/68.5 |
| 2014/0367182 | A1 * | 12/2014 | Yoshinaga | B60L 11/1898 180/68.4 |
| 2015/0375622 | A1 * | 12/2015 | Yamanaka | B60K 1/00 180/65.1 |
| 2016/0207386 | A1 * | 7/2016 | Nagaosa | B60L 3/0015 |
| 2016/0207387 | A1 * | 7/2016 | Itoga | B60K 1/04 |
| 2016/0297290 | A1 * | 10/2016 | Murata | B60K 1/04 |
| 2016/0375750 | A1 * | 12/2016 | Hokazono | B60K 1/04 180/68.5 |
| 2017/0101031 | A1 * | 4/2017 | Ohashi | H01M 8/04201 |
| 2017/0113731 | A1 * | 4/2017 | Imura | B62D 21/157 |
| 2017/0133691 | A1 | 5/2017 | Yamafuji | |
| 2017/0232830 | A1 * | 8/2017 | Waskie | B60K 5/1275 180/291 |
| 2017/0256762 | A1 * | 9/2017 | Naito | H01M 2/1083 |
| 2018/0148096 | A1 * | 5/2018 | Leier | B60K 1/00 |

FOREIGN PATENT DOCUMENTS

| | | | |
|---|---|---|---|
| JP | 2004-189158 A | | 7/2004 |
| JP | 2004-231018 | | 8/2004 |
| JP | 2006-205816 A | | 8/2006 |
| JP | 2011162108 | A * | 8/2011 |
| JP | 2016153288 | A * | 8/2016 |
| JP | 2016-199142 A | | 12/2016 |
| JP | 2017-087849 | | 5/2017 |

* cited by examiner

FUEL CELL MOUNTING STRUCTURE

CROSS-REFERENCE TO RELATED APPLICATION

This application is based on and claims priority under 35 USC 119 from Japanese Patent Application No. 2016-251928 filed on Dec. 26, 2016, the disclosure of which is incorporated by reference herein.

BACKGROUND

Technical Field

The present disclosure relates to a fuel cell mounting structure.

Related Art

There has conventionally been proposed a structure in which a weak portion is formed at a bracket for an engine (power plant) mount, and, due to this weak portion breaking at the time of a collision of the vehicle, the engine drops out from the vehicle, and the engine is prevented from flying into the vehicle cabin (see, for example, Japanese Patent Application Laid-Open (JP-A) No. 2004-231018).

However, in a case in which the power plant is a fuel cell, the above-described structure cannot be employed because causing the fuel cell to drop out from the vehicle at the time of a collision of the vehicle is prohibited by laws and regulations.

Namely, there is room for improvement in a structure that, at the time of a collision of a vehicle, mitigates input of load to a fuel cell without causing the fuel cell to drop out from the vehicle.

SUMMARY

Thus, the present disclosure provides a fuel cell mounting structure that, at the time of a collision of a vehicle, can mitigate input of load to a fuel cell without causing the fuel cell to break away from the vehicle.

A fuel cell mounting structure of a first aspect of the present disclosure includes: a pair of left and right vibration-proofing members that are provided due to front side joining portions and rear side joining portions being mounted to suspension members; and a fuel cell that is supported at least by the pair of left and right vibration-proofing members, and is disposed at vehicle body upper sides of the suspension members, wherein one of the front side joining portions and the rear side joining portions are supported so as to be rotatable with a vehicle transverse direction being an axis of rotation, and another of the front side joining portions and the rear side joining portions are structured so as to break away from the suspension members due to weak portions breaking at a time when load is inputted to the fuel cell from a vehicle body longitudinal direction.

In accordance with the first aspect of the present disclosure, when load is inputted to the fuel cell from the vehicle body longitudinal direction, the weak portions break, and the fuel cell rotates in the vehicle body longitudinal direction with the vehicle transverse direction being the axis of rotation. Accordingly, at the time of a collision of the vehicle, input of load to the fuel cell is mitigated without the fuel cell being made to break away from the vehicle.

A fuel cell mounting structure of a second aspect of the present disclosure includes: a pair of left and right vibration-proofing members that are provided due to front side joining portions and rear side joining portions being mounted to suspension members; and a fuel cell that is supported at least by the pair of left and right vibration-proofing members, and is disposed at vehicle body upper sides of the suspension members, wherein one of the front side joining portions and the rear side joining portions are supported so as to be rotatable with a vehicle transverse direction being an axis of rotation, and another of the front side joining portions and the rear side joining portions are structured so as to break away from the suspension members due to anchor portions dislocating at a time when load is inputted to the fuel cell from a vehicle body longitudinal direction.

In accordance with the second aspect of the present disclosure, when load is inputted to the fuel cell from the vehicle body longitudinal direction, the anchor portions dislocate, and the fuel cell rotates in the vehicle body longitudinal direction with the vehicle transverse direction being the axis of rotation. Accordingly, at the time of a collision of the vehicle, input of load to the fuel cell is mitigated without the fuel cell being made to break away from the vehicle.

A fuel cell mounting structure of a third aspect of the present disclosure is the fuel cell mounting structure of the first aspect, wherein the weak portions are formed to have a thickness that is thinner than other regions.

In accordance with the third aspect of the present disclosure, the weak portions are formed to have a thickness that is thinner than other regions. Accordingly, as compared with a structure in which the weak portions are not formed to have a thickness that is thinner than the other regions, it is easy for the weak portions to break when load is inputted to the fuel cell from the vehicle body longitudinal direction.

A fuel cell mounting structure of a fourth aspect of the present disclosure is the fuel cell mounting structure of the second aspect, wherein the anchor portions are formed in substantial "U" shapes in a side view seen from the vehicle transverse direction.

In accordance with the fourth aspect, the anchor portions are formed in substantial "U" shapes in a side view seen from the vehicle transverse direction. Accordingly, as compared with a structure in which the anchor portions are not formed in substantial "U" shapes in a side view seen from the vehicle transverse direction, it is easy for the anchor portions to dislocate when load is inputted to the fuel cell from the vehicle body longitudinal direction.

In accordance with the first and second aspects of the present disclosure, at the time of a collision of a vehicle, input of load to a fuel cell can be mitigated without the fuel cell being made to break away from the vehicle.

In accordance with the third aspect of the present disclosure, weak portions can be made to break easily when load is inputted to a fuel cell from the vehicle body longitudinal direction.

In accordance with the fourth aspect of the present disclosure, anchor portions can be made to easily dislocate when load is inputted to a fuel cell from the vehicle body longitudinal direction.

BRIEF DESCRIPTION OF THE DRAWINGS

Exemplary embodiments of the present disclosure will be described in detail based on the following figures, wherein.

DETAILED DESCRIPTION

Embodiments relating to the present disclosure are described in detail hereinafter with reference to the drawings. Note that, for convenience of explanation, arrow UP that is shown appropriately in the respective drawings indicates the vehicle body upward direction, arrow FR indicates the vehicle body frontward direction, and arrow RH indicates the vehicle body rightward direction. Further, in the following description, when vertical, longitudinal, and left-right directions are used without being specified, they refer to the vertical of the vehicle body vertical direction, the longitudinal of the vehicle body longitudinal direction, and the left and right of the vehicle body left-right direction (the vehicle transverse direction).

First Embodiment

Figure 1:
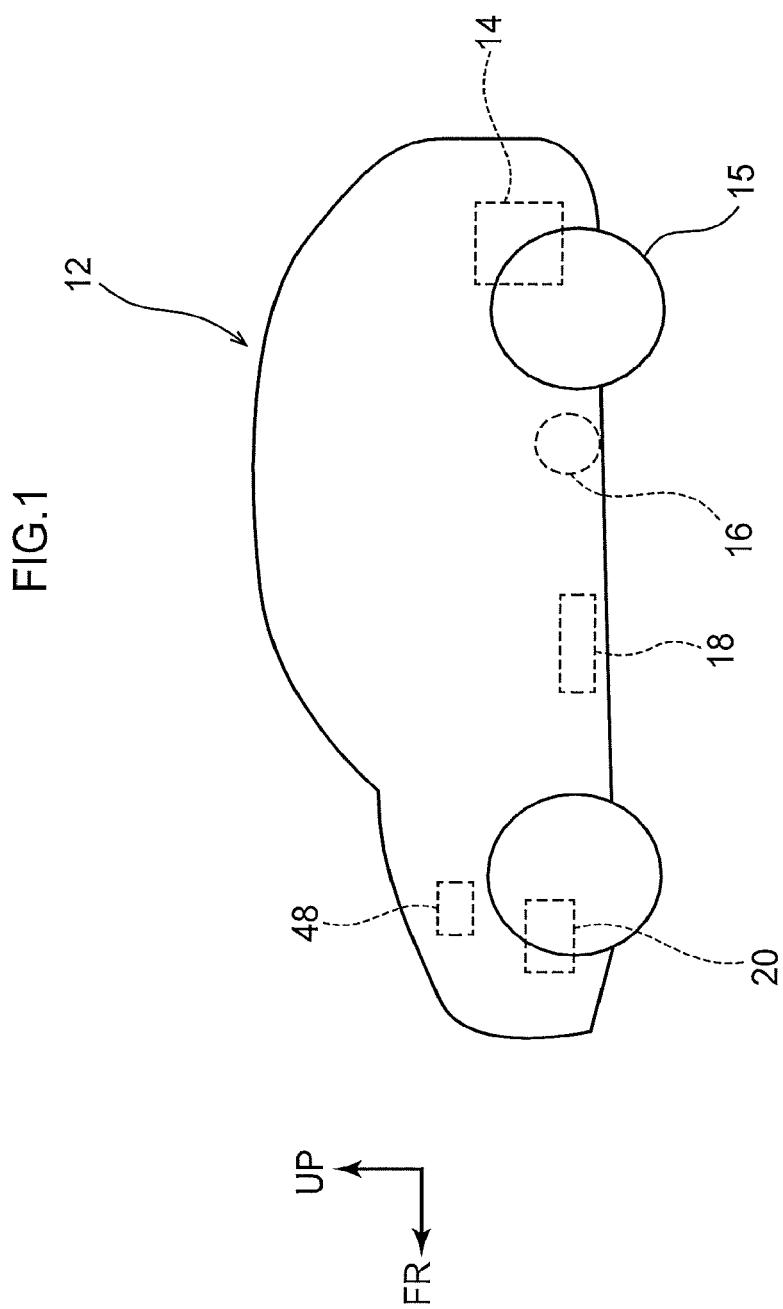
FIG. 1 is a schematic drawing showing a vehicle to which mounting structures relating to present embodiments are applied.

First, a mounting structure 10 relating to a first embodiment (see FIG. 2) is described. As shown in FIG. 1, a vehicle 12 to which the mounting structure 10 is applied is structured to include a driving motor 14 that is disposed at the rear portion of the vehicle 12, a hydrogen cylinder 16 that is disposed at the lower portion side of the rear seat, a storage battery 18 that is disposed at the lower portion side of the front seat, an FC stack 20 that serves as a fuel cell and is disposed at the front portion of the vehicle 12, and a power control unit 48 that is disposed at the vehicle body upper side of the FC stack 20.

The driving motor 14 drives by electric power that is supplied from the storage battery 18. Output from the driving motor 14 is transmitted to rear wheels 15 via a transmission mechanism (not illustrated). The storage battery 18 is a battery that is chargeable/dischargeable, and is structured so as to be able to recover regenerated electric power from the driving motor 14 at times of deceleration regeneration.

Note that, as an example, a nickel-hydrogen secondary battery is suitably used as the storage battery 18 relating to the present embodiment. However, the storage battery 18 is not limited to this, and another battery may be used provided that it is a battery that is chargeable/dischargeable. Further, a lithium-hydrogen secondary battery, or a lead storage battery or the like may be used as the storage battery 18.

The hydrogen cylinder 16 is a container in which hydrogen gas that is to be supplied to the FC stack 20 is compressed and filled. In FIG. 1, only one hydrogen cylinder 16 is illustrated, but the present disclosure is not limited to a structure in which only one hydrogen cylinder 16 is provided, and may be structured such that plural hydrogen cylinders 16 are provided.

The FC stack 20 is a stacked structure in which plural single cells, which are structural units, are layered, and functions as a high-voltage power source. Each single cell that structures the FC stack 20 is a structure that generates electricity due to the electrochemical reaction between the hydrogen gas supplied from the hydrogen cylinder 16 and compressed air supplied from an air compressor 44 (see FIG. 2) that is described later.

The power control unit 48 is a control device and has an inverter that converts direct current, which is high-voltage and is handled at the FC stack 20 and the storage battery 18, and alternating current for driving the driving motor 14. Note that the FC stack 20 and the power control unit 48 are both provided within a power unit chamber that is formed at the front portion of the vehicle 12.

Figure 2:
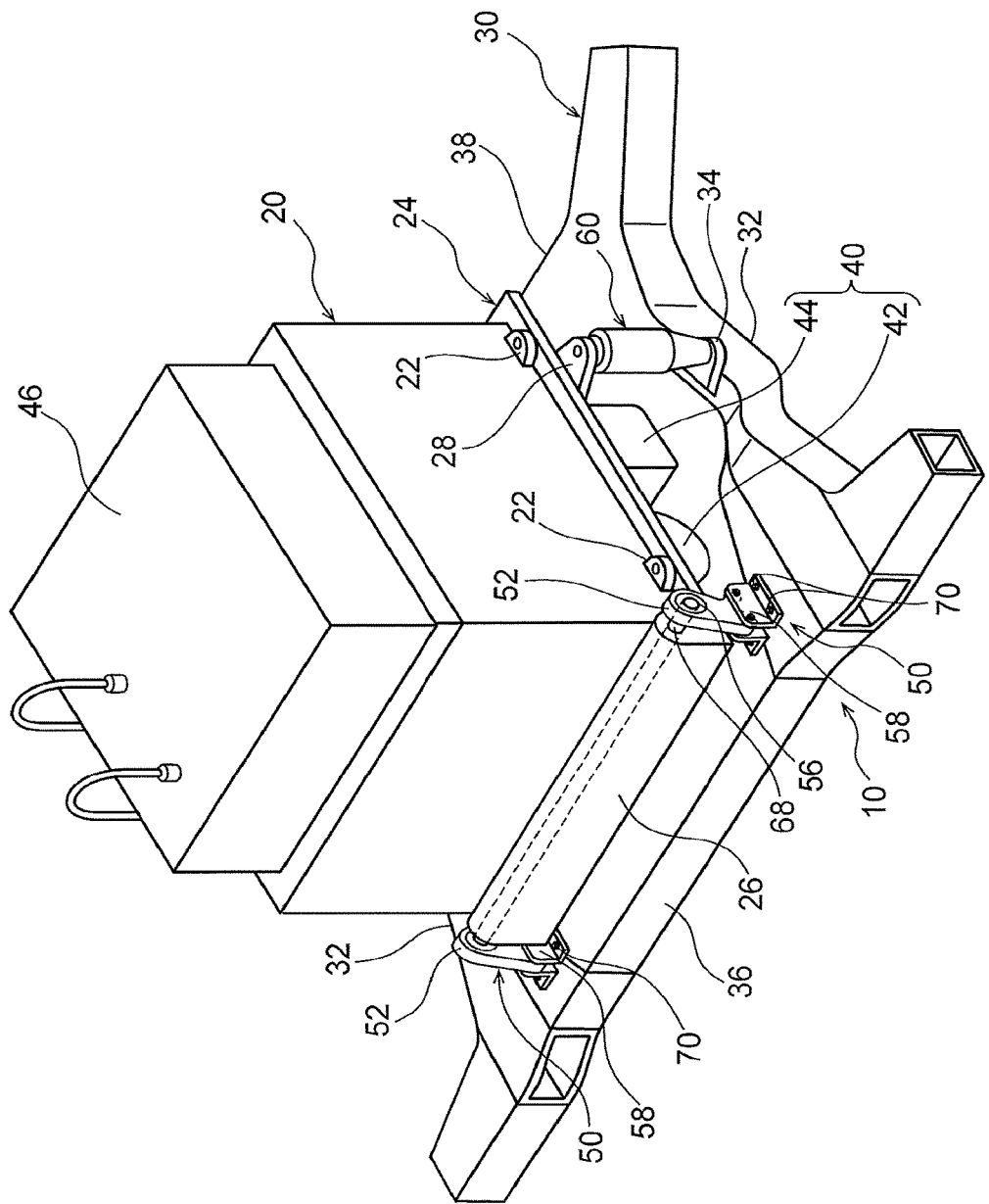
FIG. 2 is a perspective view showing a mounting structure relating to a first embodiment.
Figure 3:
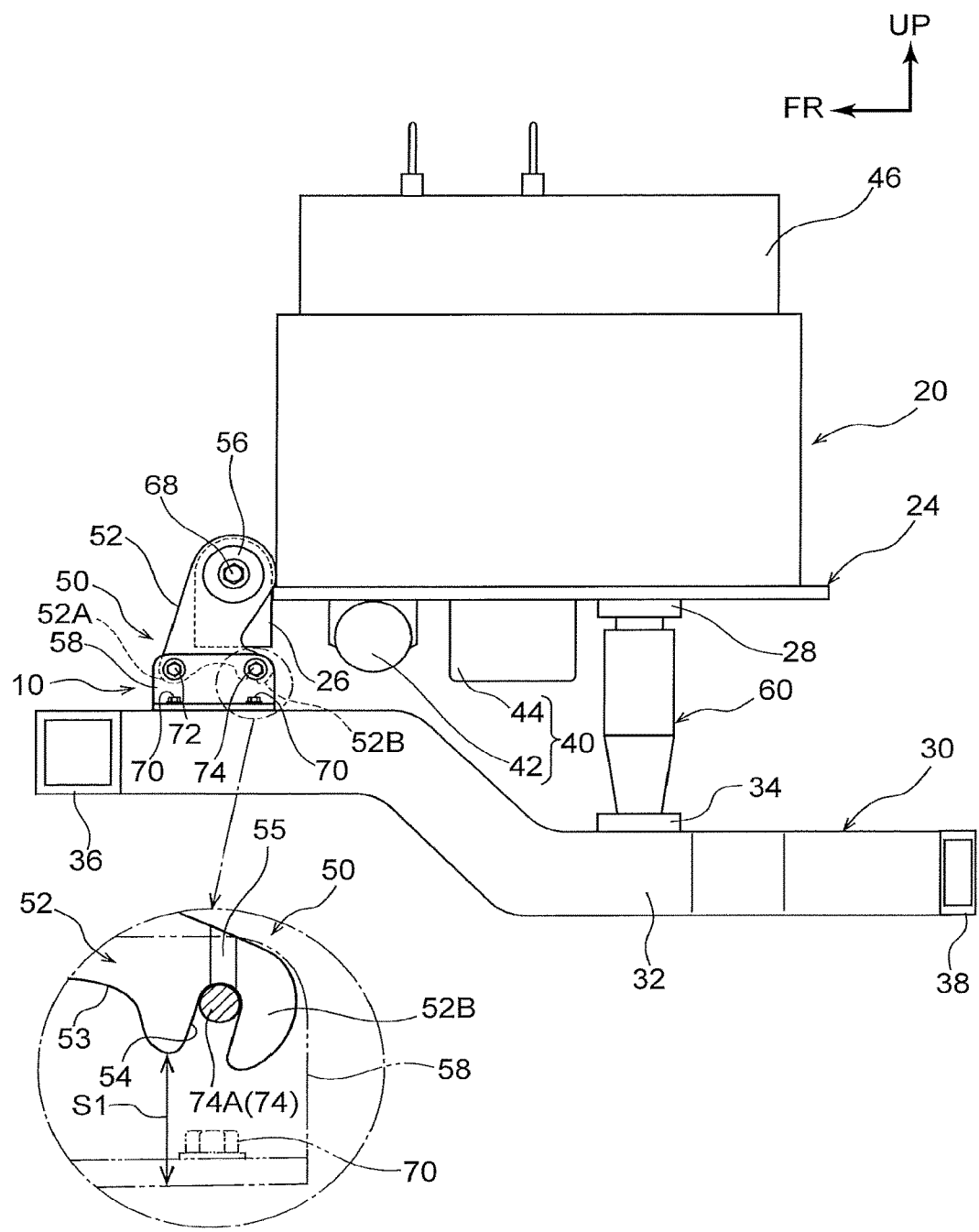
FIG. 3 is a side view showing a mounting structure relating to the first embodiment.

Further, as shown in FIG. 2 and FIG. 3, the FC stack 20 is formed in a substantially parallelepiped shape, and is placed on and fixed to the top surface of a stack frame 24. Namely, front and rear pairs of fixing pieces 22, which project out from respective side walls toward the vehicle transverse direction outer sides, are provided at the left and right both side walls of the FC stack 20. These fixing pieces 22 are respectively fastened and fixed by bolts and nuts (neither of which is illustrated) to the outer peripheral portion of the stack frame 24.

As seen in plan view, the stack frame 24 is formed substantially in the shape of a rectangular plate whose plate thickness direction is the vehicle body vertical direction. A standing wall portion 26 that projects-out toward the vehicle body upper side is provided integrally with the front end portion of the stack frame 24. Bolt holes (not illustrated) whose axial direction is the vehicle transverse direction are formed in the upper portion of the standing wall portion 26. Bolts 68 that are described later are screwed-together with these bolt holes.

Further, as shown in FIG. 2, the FC stack 20, together with the stack frame 24, is disposed at the vehicle body upper side of a suspension member 30. The suspension members 30 are disposed at the vehicle body lower sides of the front portion sides of a pair of left and right front side members (not illustrated) that extend in the vehicle body longitudinal direction, and are supported in states of hanging-down from these front side members.

The suspension member 30 has a pair of left and right side rail portions 32 that extend along the vehicle body longitudinal direction. The respective side rail portions 32 extend in directions of moving apart from one another while heading toward the vehicle body front side, and the front end portions thereof are integrally connected by a front cross member 36 that extends in the vehicle transverse direction. The rear end portions of the respective side rail portions 32 are integrally connected by a rear cross member 38 that extends in the vehicle transverse direction. Namely, in a plan view seen from the vehicle body upper side, the suspension member 30 is formed substantially in the shape of a rectangular frame.

Auxiliary equipment 40 that does not contact the suspension member 30 is mounted to the bottom surface of the stack frame 24. The auxiliary equipment 40 is structured to include a compressor 42 for the air conditioner that compresses and liquefies coolant that is used in the air conditioner, a water pump (not illustrated) for the FC that serves as a pump that circulates cooling water, the air compressor 44 for supplying compressed air to the FC stack 20, and a hydrogen pump (not illustrated) that circulates hydrogen gas.

Pipes that structure a flow path for the coolant are connected to the compressor 42 for the air conditioner, and pipes that structure a flow path for the cooling water are connected to the water pump for the FC. Pipes that structure a flow path for hydrogen are connected to the hydrogen pump. Due to the water pump for the FC circulating cooling water, the FC stack 20 is cooled and is maintained at a predetermined temperature. The hydrogen pump supplies hydrogen gas, which is discharged-out as is without having reacted, from the FC stack 20 to the FC stack 20 again.

The above-described auxiliary equipment 40 are disposed at a position that is substantially hidden by the stack frame 24 as seen in plan view. A DC-DC converter 46, which is one size smaller than the FC stack 20 as seen in plan view, is mounted to the top surface of the FC stack 20. The DC-DC converter 46 is electrically connected to the FC stack 20, and converts the voltage value of the DC current generated by the FC stack 20 into a different voltage value.

As shown in FIG. 2 and FIG. 3, the stack frame 24, to whose top surface the FC stack 20 is fixed, is supported by plural vibration-proofing members that serve as supporting means and are mounted to the respective side rail portions 32, i.e., by a pair of left and right front mount members 50 and a pair of left and right rear mount members 60. The stack frame 24 is provided at the vehicle body upper side of the suspension member 30.

In further detail, the front mount members 50 that respectively serve as front side vibration-proofing members are mounted to the front portion sides of the pair of left and right side rail portions 32. The rear mount members 60 that respectively serve as rear side vibration-proofing members are mounted to the rear portion sides of the pair of left and right side rail portions 32.

Each of the front mount members 50 has a front mount main body 52 whose plate thickness direction is the vehicle transverse direction, and a pair of left and right brackets 58 for mounting a front side joining portion 52A and a rear side joining portion 52B, which are at the lower end portion of this front mount main body 52, to the top surface side of the side rail portion 32.

The pair of left and right brackets 58 are fastened and fixed by bolts 70 and weld nuts (not illustrated) to the connected portion, which is connected with the front cross member 36, at the side rail portion 32. The interval in the vehicle transverse direction between the pair of left and right brackets 58 is substantially the same as the plate thickness of the front mount main body 52.

Further, as shown in FIG. 3, a through-hole (not illustrated) through which a bolt 72 is inserted is formed in the front side joining portion 52A that is at the lower end portion of the front mount main body 52. An anchor portion 54, which is substantially "U" shaped and opens toward the vehicle body lower side in a side view seen from the vehicle transverse direction and that can fit-together with a shaft portion 74A of a bolt 74, is formed in the rear side joining portion 52B that is at the lower end portion of the front mount main body 52.

Front side through-holes (not illustrated) and rear side through-holes (not illustrated), through which the bolts 72, 74 are inserted, are formed in the upper portions of the pair of left and right brackets 58 that face one another in the vehicle transverse direction at the aforementioned interval. These through-holes can communicate with the through-hole that is formed in the front side joining portion 52A of the front mount main body 52 and the anchor portion 54 that is formed at the rear side joining portion 52B, respectively.

Accordingly, due to the lower end portion of the front mount main body 52 being inserted between the pair of left and right brackets 58, and the bolt 72 being inserted from the vehicle transverse direction outer side through the front side through-holes of the pair of left and right brackets 58 and through the through-hole of the front side joining portion 52A, and the bolt 72 being screwed-together with a nut (not illustrated), this front side joining portion 52A is supported so as to be able to rotate with respect to the bracket 58 with the vehicle transverse direction being the axial direction (around the bolt 72).

Further, due to the bolt 74 being inserted from the vehicle transverse direction outer side through the rear side through-holes of the pair of left and right brackets 58, and the anchor portion 54 of the rear side joining portion 52B fitting-together with and anchoring on the shaft portion 74A of the bolt 74 from the vehicle body upper side, and the bolt 74 being screwed together with a nut (not illustrated), this rear side joining portion 52B is nipped by the pair of left and right brackets 58 at a predetermined pressure.

Due to the above, the lower end portion (the front side joining portion 52A and the rear side joining portion 52B) of the front mount main body 52 is mounted, via the brackets 58, in a state in which there is a predetermined interval S1 (see FIG. 3) in the vehicle body vertical direction with respect to the top surface of the suspension member 30.

Further, a weak portion 55 is formed at the portion of the anchor portion 54 which portion contacts the shaft portion 74A of the bolt 74 from the upper side (the portion that is disposed at the upper side with respect to the shaft portion 74A of the bolt 74). The weak portion 55 is structured due to, for example, the region thereof being made to be a plate that is thinner than the other regions (the thickness thereof being made to be thinner). The weak portion 55 is structured such that, when load is applied to the weak portion 55 relatively from the lower side by the shaft portion 74A of the bolt 74, the weak portion 55 can be broken from the lower side by the shaft portion 74A of the bolt 74.

Further, a through-hole (not illustrated) is formed in the upper portion of the front mount main body 52, and the bolt 68 is inserted-through this through-hole. The bolt 68 is screwed-together with the standing wall portion 26 that is provided at the front end portion of the stack frame 24. The front mount member 50 (the front mount main body 52) is fastened and fixed to the stack frame 24 by this bolt 68.

Note that an elastic body 56, which is elastically deformable and serves as a vibration-proofing rubber, is provided between the inner peripheral surface of this through-hole and the outer peripheral surface of the bolt 68. The bolt 68 is mounted via this elastic body 56 to the upper portion of the front mount member 50 (the front mount main body 52). Further, a cut-out portion 53, which is cut-out in a substantial arc-shape toward the vehicle body upper side as seen in side view, is formed at the lower end portion of the front mount main body 52 between the front side joining portion 52A and the rear side joining portion 52B.

The rear mount member 60 is formed substantially in the shape of a cylinder whose axial direction is the vehicle body vertical direction. An elastic body (not illustrated), which is elastically deformable and serves as a vibration-proofing rubber, is provided at the interior of the rear mount member 60. The rear mount member 60 is provided at the side rail portion 32 at a position that is further toward the vehicle body front side than the connected portion which is connected to the rear cross member 38, and that is offset toward vehicle transverse direction outer side.

Namely, the lower end portion of the rear mount member 60 is mounted to a lower side fixing piece 34 that projects-out toward the vehicle transverse direction outer side from the top surface of the side rail portion 32. The upper end portion of the rear mount member 60 is mounted to an upper side fixing plate 28 that projects-out toward the vehicle transverse direction outer side from the bottom surface of the stack frame 24. Due thereto, the rear mount member 60 is disposed between the lower side fixing piece 34 and the upper side fixing piece 28 at further toward the vehicle transverse direction outer side than the side rail portion 32 and the stack frame 24, and connects the lower side fixing piece 34 and the upper side fixing piece 28 in the vehicle body vertical direction.

Further, the rear mount member 60 is formed so as to have strength that is lower than the fastening strength of the FC stack 20 to the stack frame 24. As described hereinafter, when load is inputted to the FC stack 20 from the vehicle body front side, the rear mount member 60 is damaged before the FC stack 20 is damaged.

Operation of the mounting structure 10, which relates to the first embodiment and is structured as described above, is described next.

Figure 4:
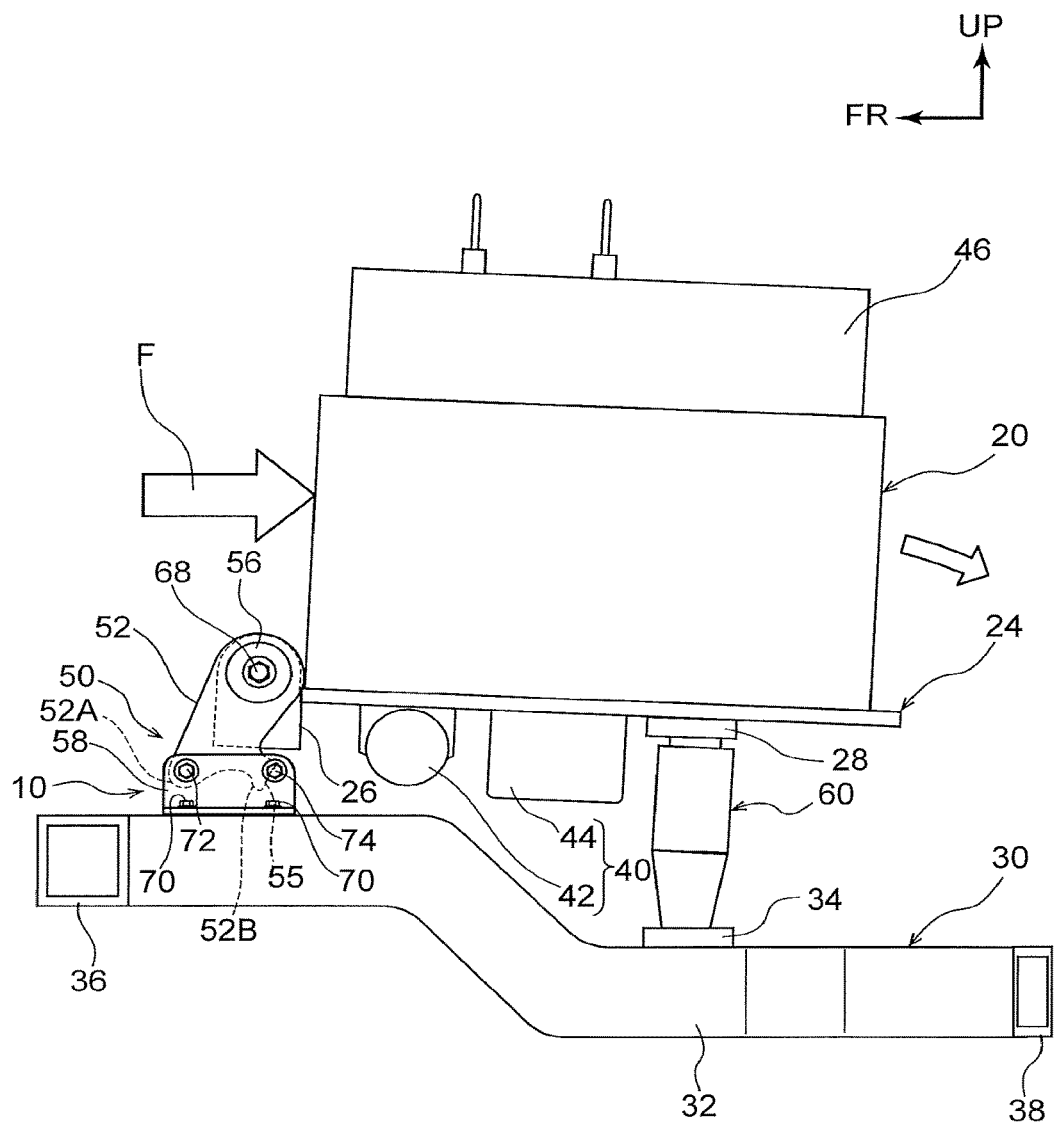
FIG. 4 is a side view showing a state in which load has been inputted from the vehicle body front side to an FC stack of the mounting structure relating to the first embodiment, and weak portions of front mount members have broken.

As shown in FIG. 4, when collision load F is inputted from the vehicle body front side to the FC stack 20 at the time of a front collision of the vehicle 12 (e.g., at the time of a front collision in which the vehicle 12 enters-into the rear bumper of a truck), the rear mount members 60 are damaged before the FC stack 20, and load that is directed toward the vehicle body rear side is inputted to the standing wall portion 26 via the stack frame 24, and load that is directed toward the vehicle body rear side is inputted to the upper portions of the front mount members 50 (the front mount main bodies 52) via the standing wall portion 26 (the bolts 68 and the elastic bodies 56).

Thereupon, the upper portions of the front mount main bodies 52 start to rotate toward the vehicle body rear side around the bolts 72 that are inserted-through the through-holes of the front side joining portions 52A that are at the lower end portions of the front mount main bodies 52. Therefore, load is applied from the vehicle body upper side by the anchor portions 54 to the shaft portions 74A of the bolts 74 that are fit-together with the anchor portions 54 of the rear side joining portions 52B that are at the lower end portions of the front mount main bodies 52. Namely, load is applied relatively from the lower side to the weak portions 55 of the anchor portions 54 by the shaft portions 74A of the bolts 74. Due thereto, the weak portions 55 break from the lower sides, and the rear side joining portions 52B break away from the suspension members 30.

Figure 5:
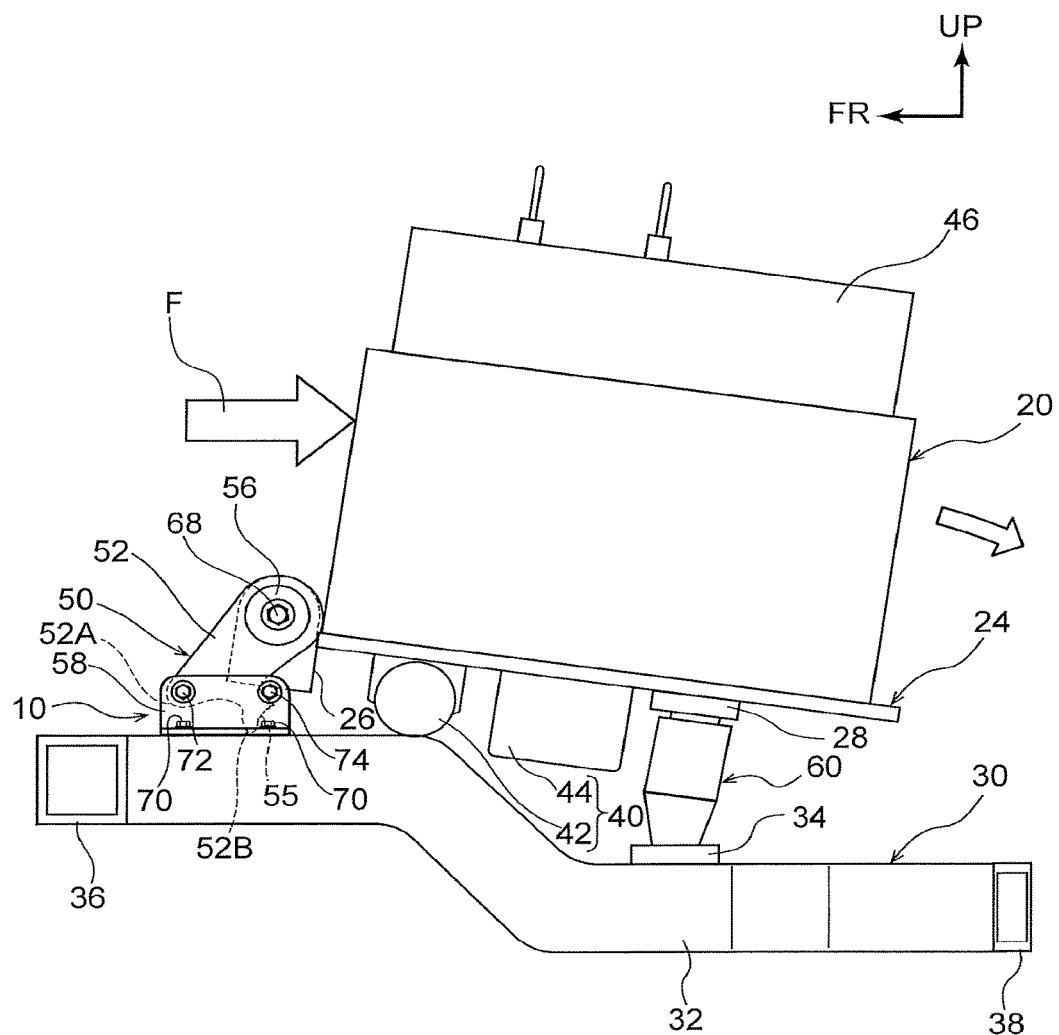
FIG. 5 is a side view showing a state in which the FC stack of the mounting structure relating to the first embodiment has rotated toward the vehicle body rear side with the vehicle transverse direction being the axis of rotation.

Further, the predetermined interval S1 is formed between the lower end portions of the front mount main bodies 52 and the top surfaces of the suspension members 30. Thus, as shown in FIG. 5, the front mount main bodies 52 rotate toward the vehicle body rear side around the bolts 72 that are inserted-through the through-holes of the front side joining portions 52A that are at the lower end portions of the front mount main bodies 52. Accordingly, at least some of the energy of the collision load F that is inputted to the FC stack 20 is absorbed by the rotation of the front mount main bodies 52 (the FC stack 20) toward the vehicle body rear side.

In this way, in accordance with the first embodiment, input of load to the FC stack 20 can be mitigated without the FC stack 20 being made to break away from the vehicle 12. Further, there is no need to separately provide a protecting member or the like for protecting the FC stack 20. Therefore, the manufacturing cost can be reduced, an increase in the weight of the vehicle 12 can be suppressed or prevented, and a deterioration in the fuel efficiency can be suppressed or prevented.

Further, the auxiliary equipment 40 is disposed at a position that is substantially hidden by the stack frame 24 as seen in plan view. Therefore, even in a case in which suspension members (not illustrated) of conventional vehicles that use only an engine as the drive source are utilized, the auxiliary equipment 40 interfering with these suspension members can be suppressed or prevented. Accordingly, suspension members can be used in common with conventional vehicles, and the parts cost (manufacturing cost) can be reduced.

Second Embodiment

The mounting structure 10 relating to a second embodiment is described next. Note that regions that are equivalent to those of the first embodiment are denoted by the same reference numerals, and detailed description thereof (including description of common operation) is omitted as appropriate.

Figure 6:
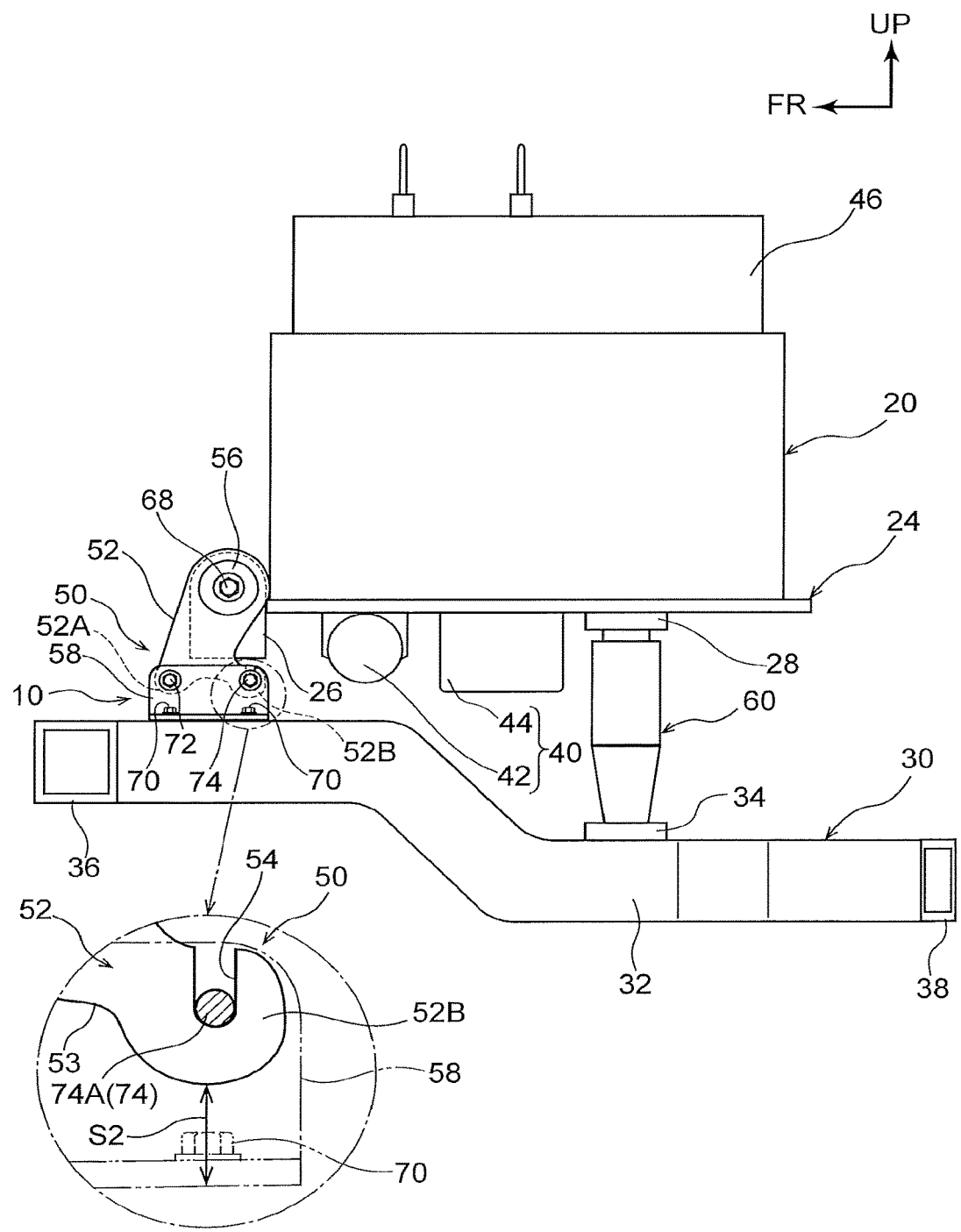
FIG. 6 is a side view showing a mounting structure relating to a second embodiment.

As shown in FIG. 6, in the second embodiment, the orientation of the anchor portion 54 that is formed at the rear side joining portion 52B that is at the lower end portion of the front mount main body 52 is upside-down as compared with that of the first embodiment. Namely, in a side view seen from the vehicle transverse direction, this anchor portion 54 is formed in a substantial "U" shape that opens toward the vehicle body upper side, and is fit-together with the shaft portion 74A of the bolt 74 from the vehicle body lower side. Further, due to the bolt 74 being screwed-together with a nut (not illustrated), the rear side joining portion 52B that is at the lower end portion of the front mount main body 52 is nipped at a predetermined pressure by the pair of left and right brackets 58.

Figure 7:
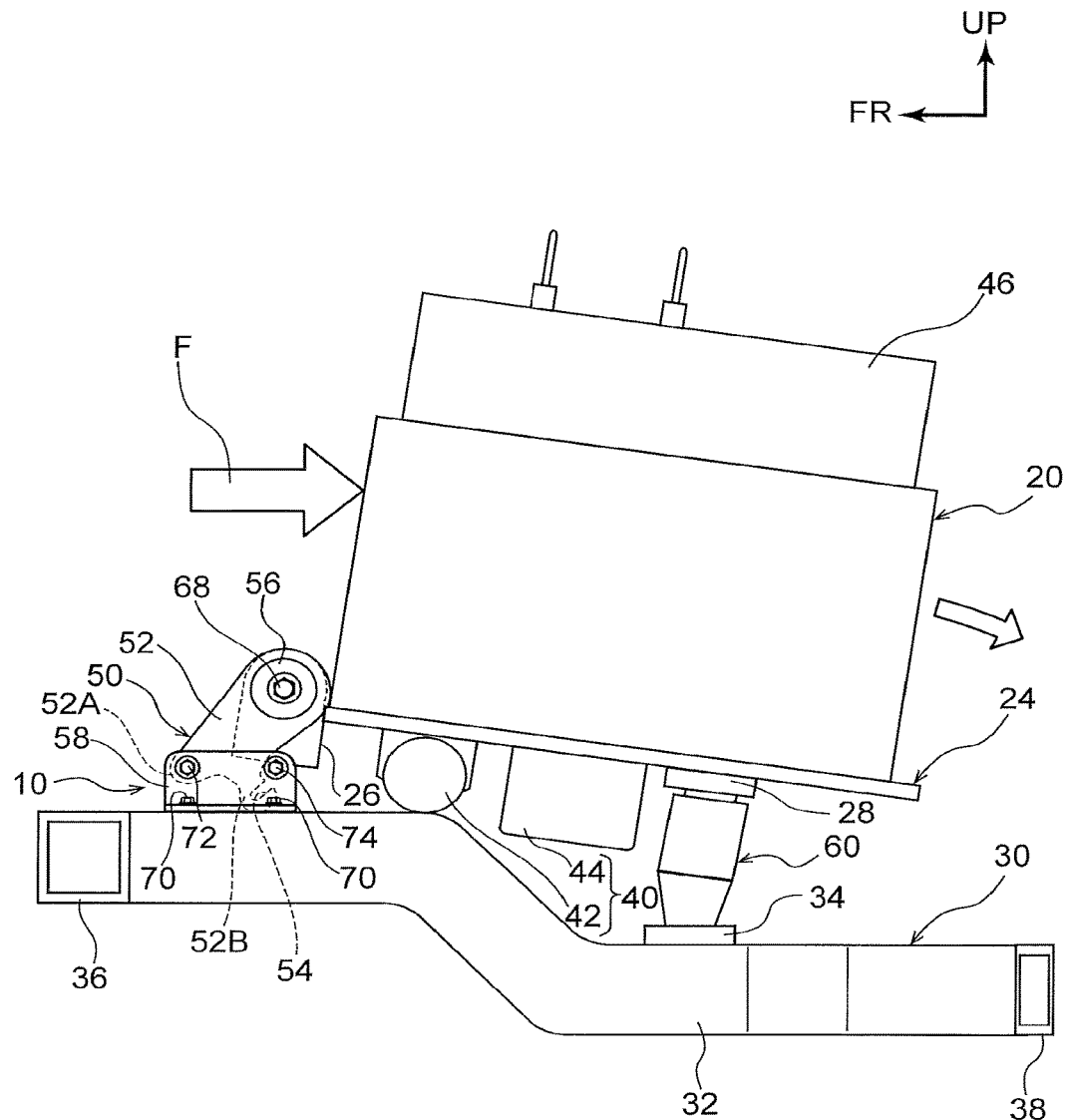
FIG. 7 is a side view showing a state in which load has been inputted from the vehicle body front side to the FC stack of the mounting structure relating to the second embodiment, anchor portions have dislocated, and the FC stack has rotated toward the vehicle body rear side with the vehicle transverse direction being the axis of rotation.

Accordingly, in the second embodiment, at the time of a front collision of the vehicle 12, when the collision load F is inputted to the FC stack 20 from the vehicle body front side, and the front mount main bodies 52 start to rotate toward the vehicle body rear side around the bolts 72 that are inserted-through the through-holes of the front side joining portions 52A that are at the lower end portions of the front mount main bodies 52, as shown in FIG. 7, load toward the vehicle body lower side is applied to the rear side joining portions 52B that are at the lower end portions of the front mount main bodies 52, and the anchor portions 54 dislocate from the shaft portions 74A of the bolts 74.

Namely, because the rear side joining portions 52B break away from the suspension members 30, and predetermined intervals S2 (see FIG. 6) are formed between the lower end portions of the front mount main bodies 52 and the top surfaces of the suspension members 30, the front mount main bodies 52 rotate toward the vehicle body rear side around the bolts 72 that are inserted-through the through-holes of the front side joining portions 52A that are at the lower end portions of the front mount main bodies 52. Accordingly, at least a portion of the energy of the collision load F that is inputted to the FC stack 20 is absorbed by the rotation of the front mount main bodies 52 (the FC stack 20) toward the vehicle body rear side.

In this way, in accordance with the second embodiment, input of load to the FC stack 20 can be mitigated without the FC stack 20 being made to break away from the vehicle 12. Note that, in the case of this second embodiment, there is merely a structure in which the anchor portions 54 dislocate from the shaft portions 74A of the bolts 74. Therefore, this is a structure in which the weak portions 55 are not formed (there is no need to form the weak portions 55) at the portions, which contact the shaft portions 74A of the bolts 74 from the lower sides (the portions that are disposed at the lower sides with respect to the shaft portions 74A of the bolts 74), of the anchor portions 54.

Third Embodiment

The mounting structure 10 relating to a third embodiment is described next. Note that regions that are equivalent to those of the first embodiment and the second embodiment are denoted by the same reference numerals, and detailed description thereof (including description of common operation) is omitted as appropriate.

Figure 8:
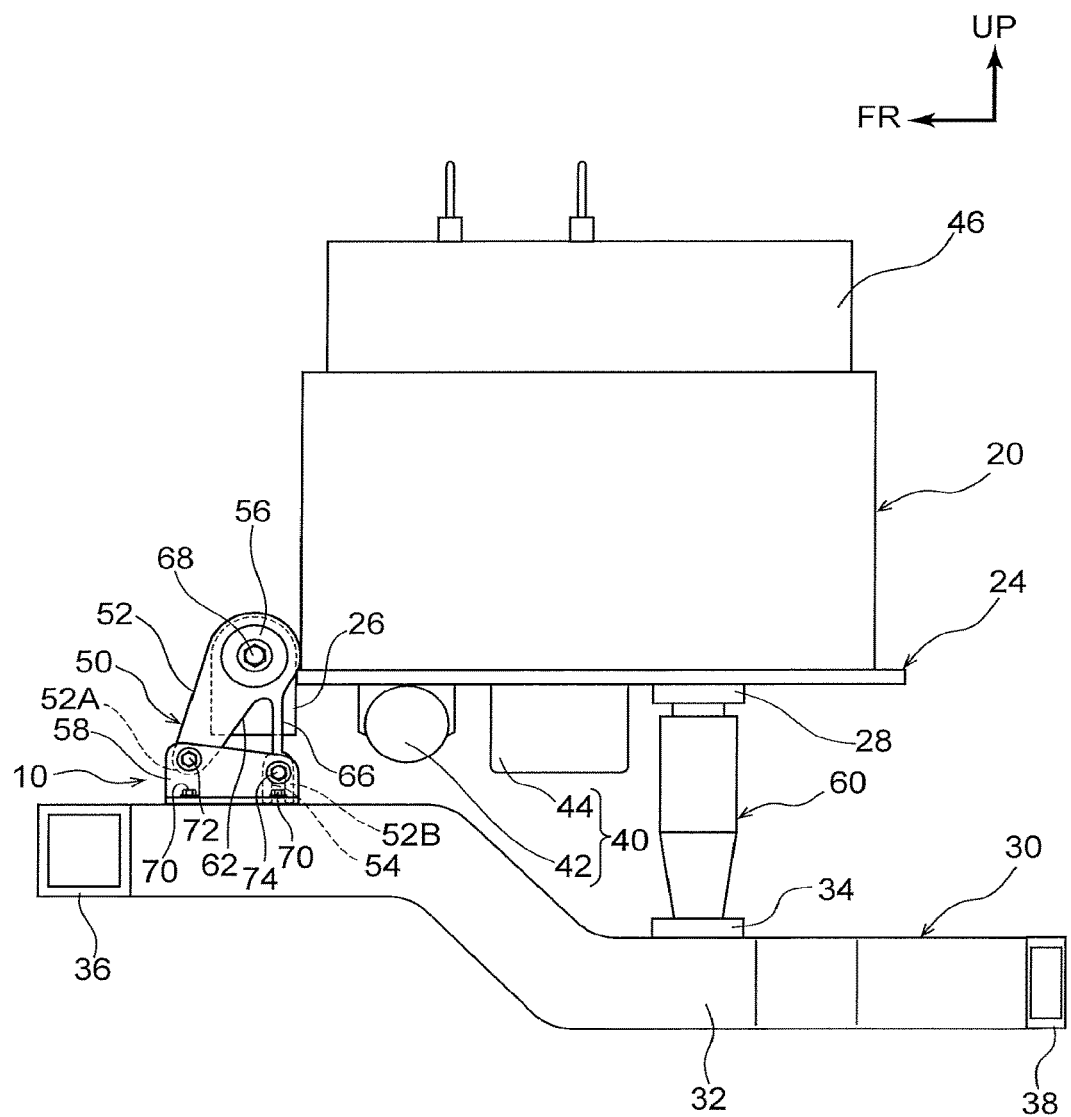
FIG. 8 is a side view showing a mounting structure relating to a third embodiment.

As shown in FIG. 8, in the third embodiment, a cut-out portion 62, which is cut-out toward the vehicle body upper side more greatly than the cut-out portion 53 of the first embodiment, is formed in the lower end portion of the front mount main body 52. The upper portion of the front mount main body 52 and the rear side joining portion 52B that has the anchor portion 54 are connected by a weak portion 66 that is narrow and has sufficient yield strength at usual times (at times when load is not inputted to the FC stack 20 from the vehicle body longitudinal direction).

Accordingly, in the third embodiment, at the time of a front collision of the vehicle 12, when load that is directed toward the vehicle body front side is inputted to the FC stack 20 due to inertial force, load that is directed toward the vehicle body front side is inputted to the standing wall portion 26 via the stack frame 24, and load that is directed toward the vehicle body front side is inputted to the upper portions of the front mount members 50 (the front mount main bodies 52) via the standing wall portion 26 (the bolts 68 and the elastic bodies 56).

Figure 9:
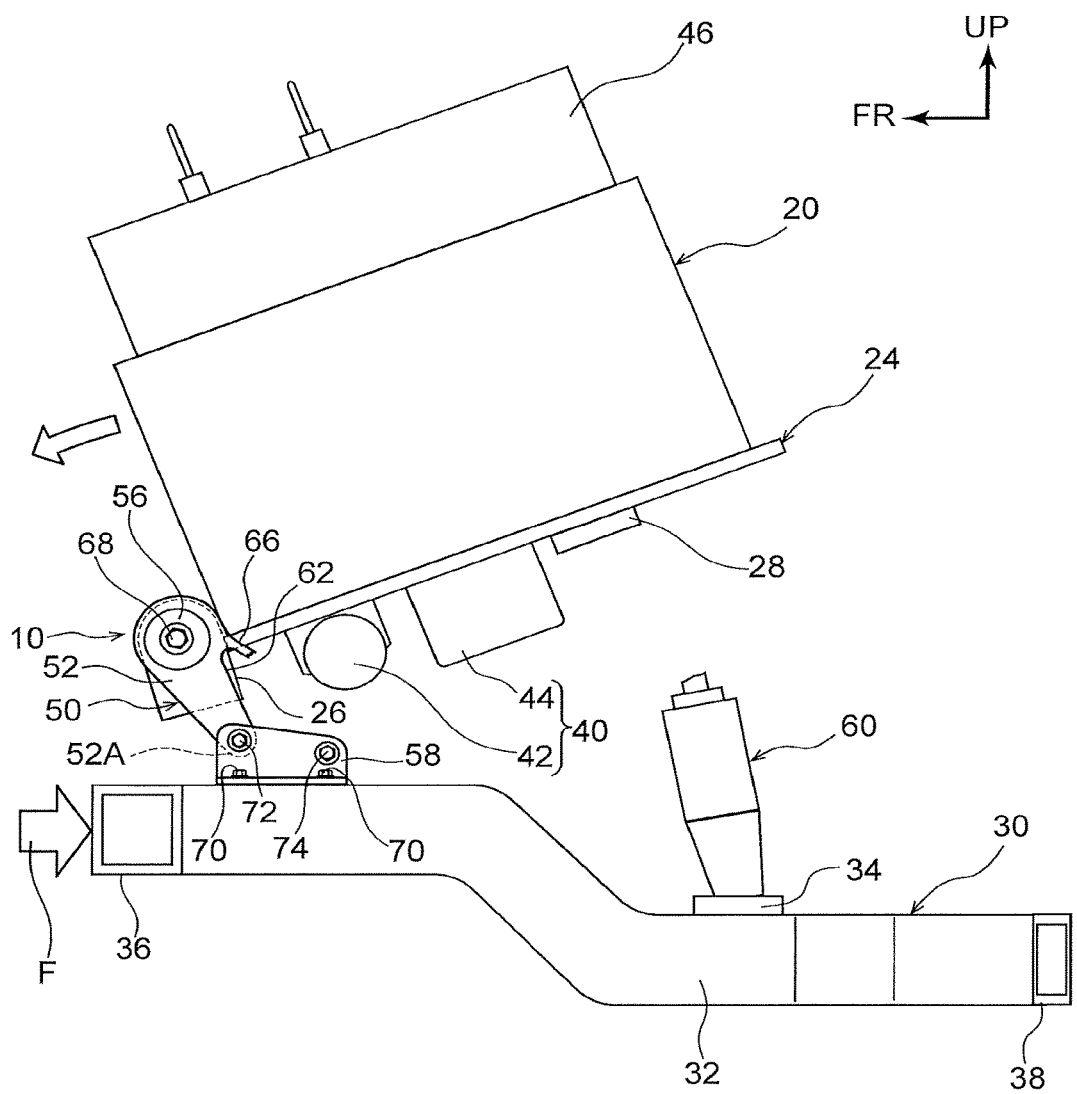
FIG. 9 is a side view showing a state in which inertial force that is directed toward the vehicle body front side has been inputted to the FC stack of the mounting structure relating to the third embodiment, weak portions of the front mount members have broken, and the FC stack has rotated toward the vehicle body front side with the vehicle transverse direction being the axis of rotation.

Thereupon, as shown in FIG. 9, for example, the upper end portions of the rear mount members 60, which are mounted to the upper side fixing pieces 28 of the stack frame 24, break, and the weak portions 66 of the front mount main bodies 52 are pulled and break due to concentration of load, and the rear side joining portions 52B break away from the suspension members 30, and the front mount main bodies 52 rotate toward the vehicle body front side around the bolts 72 that are inserted-through the through-holes of the front side joining portions 52A that are at the lower end portions of the front mount main bodies 52. Accordingly, at least a portion of the energy of the load that is inputted to the FC stack 20 is absorbed by the rotation of the front mount main bodies 52 (the FC stack 20) toward the vehicle body front side.

In this way, in accordance with the third embodiment, input of load to the FC stack 20 can be mitigated without the FC stack 20 being made to break away from the vehicle 12. Note that, in the case of the third embodiment, an impact absorbing member (not illustrated) such as a crash box may be provided at the front surface of the FC stack 20.

Namely, when the FC stack 20 rotates (moves) toward the vehicle body front side around the bolts 72 that are inserted-through the through-holes of the front side joining portions 52A, this impact absorbing member plastically deforms and absorbs energy. Due thereto, it may be made such that the FC stack 20 colliding with vehicle structural parts (not illustrated) that are disposed at the vehicle body front portion, and the FC stack 20 breaking, is suppressed or prevented.

Fourth Embodiment

The mounting structure 10 relating to a fourth embodiment is described next. Note that regions that are equivalent to those of the first embodiment through the third embodiment are denoted by the same reference numerals, and detailed description thereof (including description of common operation) is omitted as appropriate.

Figure 10:
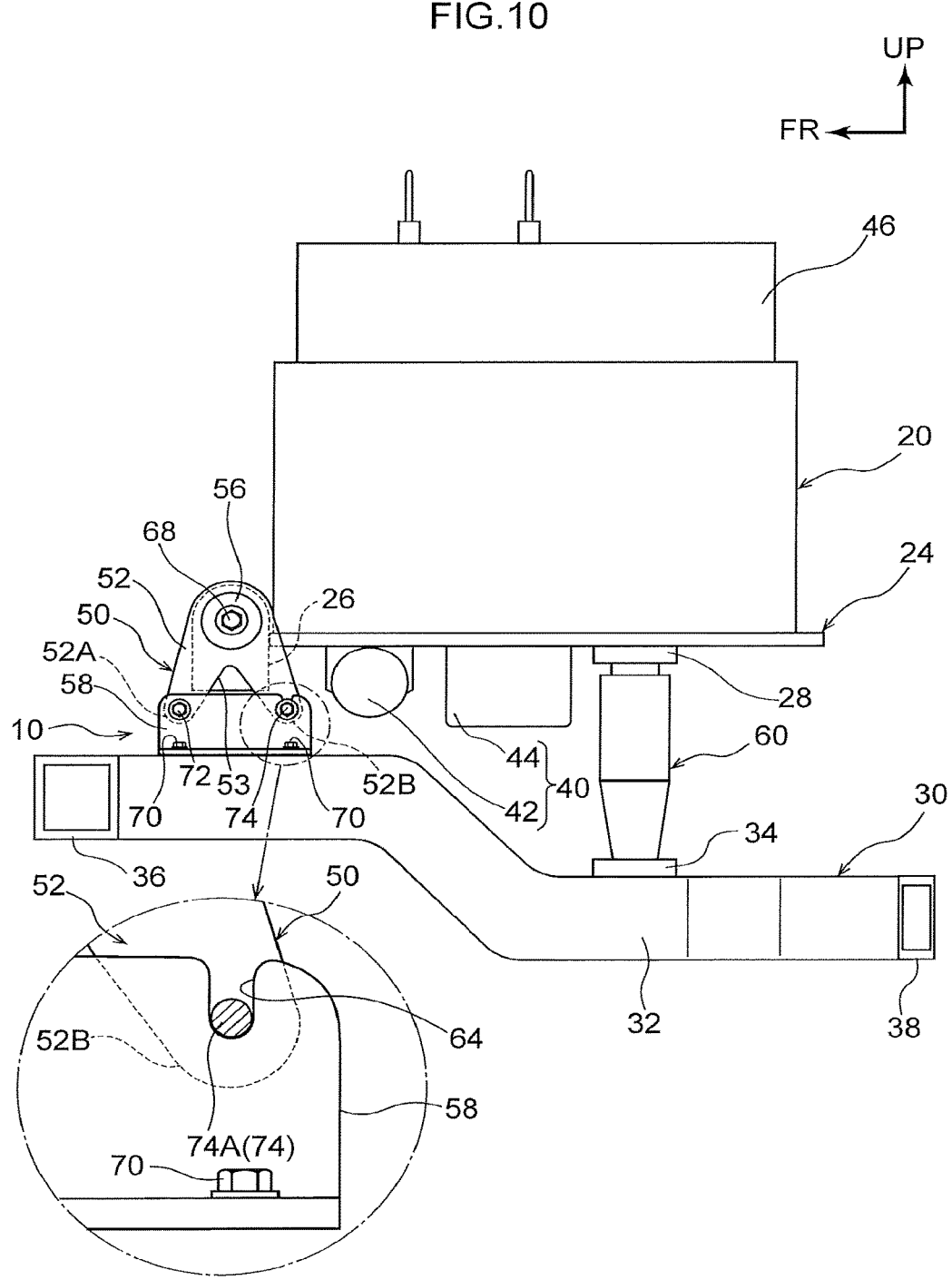
FIG. 10 is a side view showing a mounting structure relating to a fourth embodiment.

As shown in FIG. 10, in the fourth embodiment, the anchor portion 54 is not formed at the rear side joining portion 52B that is at the lower end portion of the front mount main body 52. An anchor portion 64, which is substantially "U" shaped and opens toward the vehicle body upper side in a side view seen from the vehicle transverse direction, is formed at the upper end portion of the rear side of the bracket 58.

Further, a through-hole (not illustrated) is formed in the rear side joining portion 52B that is at the lower end portion of the front mount main body 52, and the bolt 74 is inserted-through this through-hole. Accordingly, due to the shaft portion 74A of the bolt 74 being fit-together with the anchor portion 64 of the bracket 58 from the upper side, and the bolt 74 being screwed-together with a nut (not illustrated), the rear side joining portion 52B that is at the lower end portion of the front mount main body 52 is nipped at a predetermined pressure by the pair of left and right brackets 58.

Accordingly, in the fourth embodiment, at the time of a front collision of the vehicle 12, when load that is directed toward the vehicle body front side is inputted to the FC stack 20 by inertial force, load that is directed toward the vehicle body front side is inputted to the standing wall portion 26 via the stack frame 24, and load that is directed toward the vehicle body front side is inputted to the upper portions of the front mount members 50 (the front mount main bodies 52) via the standing wall portion 26 (the bolts 68 and the elastic bodies 56).

Figure 11:
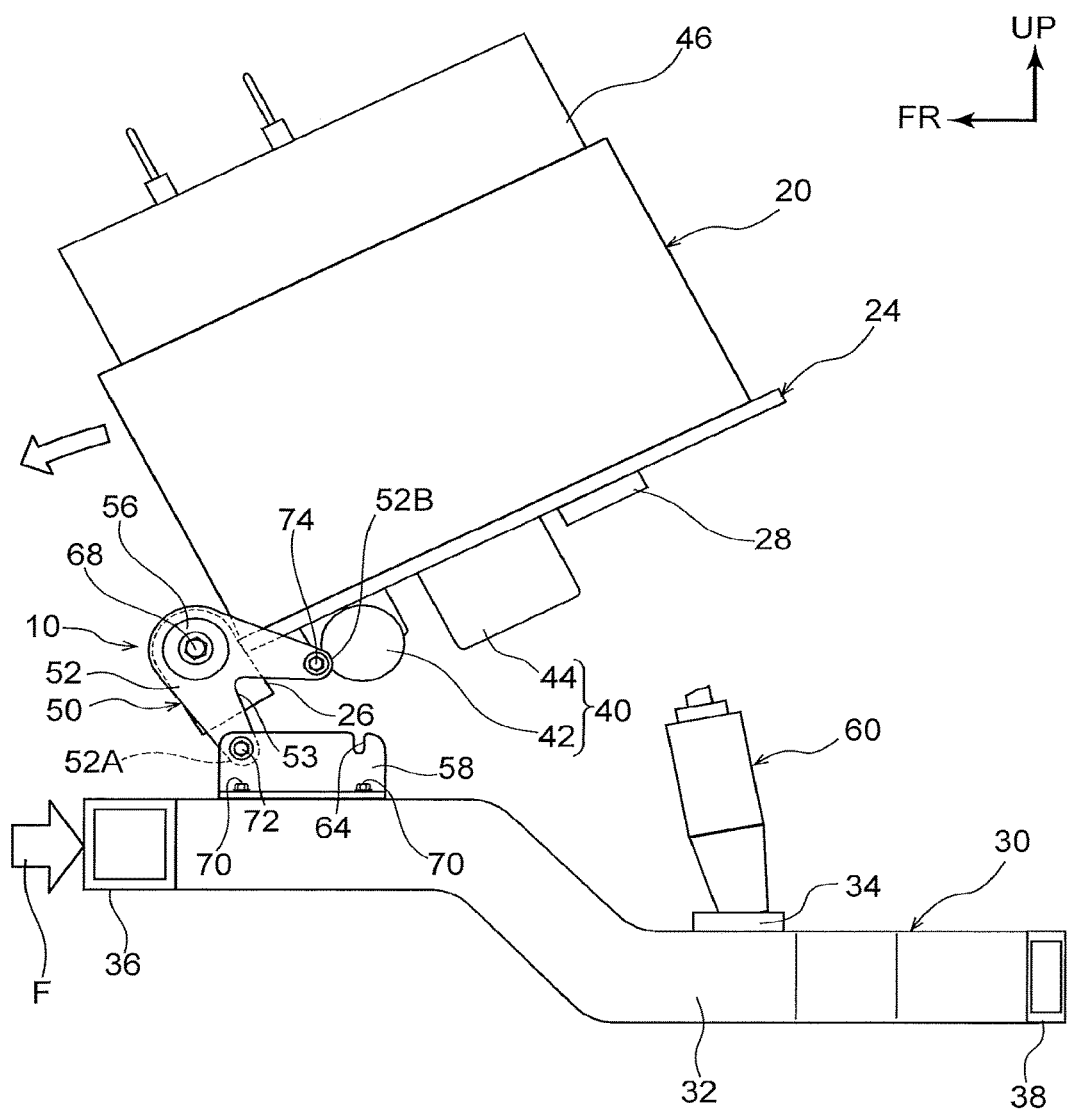
FIG. 11 is a side view showing a state in which inertial force that is directed toward the vehicle body front side has been inputted to the FC stack of the mounting structure relating to the fourth embodiment, anchor portions have dislocated, and the FC stack has rotated toward the vehicle body front side with the vehicle transverse direction being the axis of rotation.

Thereupon, as shown in FIG. 11, for example, the upper end portions of the rear mount members 60, which are mounted to the upper side fixing pieces 28 of the stack frame 24, break, and the shaft portions 74A of the bolts 74 dislocate from the anchor portions 64 of the brackets 58, and the rear side joining portions 52B break away from the suspension members 30, and the front mount main bodies 52 rotate toward the vehicle body front side around the bolts 72 that are inserted-through the through-holes of the front side joining portions 52A that are at the lower end portions of the front mount main bodies 52. Accordingly, at least a portion of the energy of the load that is inputted to the FC stack 20 is absorbed by rotation of the front mount main bodies 52 (the FC stack 20) toward the vehicle body front side.

In this way, in accordance with the fourth embodiment, input of load to the FC stack 20 can be mitigated without the FC stack 20 being made to break away from the vehicle 12. Note that, in the case of the fourth embodiment as well, in the same way as in the above-described third embodiment, an impact absorbing member (not illustrated) such as a crash box may be provided at the front surface of the FC stack 20.

Namely, when the FC stack 20 rotates (moves) toward the vehicle body front side around the bolts 72 that are inserted-through the through-holes of the front side joining portions 52A, this impact absorbing member plastically deforms and absorbs energy. Due thereto, it may be made such that the FC stack 20 colliding with vehicle structural parts (not illustrated) that are disposed at the vehicle body front portion, and the FC stack 20 breaking, is suppressed or prevented.

The mounting structures 10 of the FC stack 20 (fuel cell) relating to the present embodiments have been described above on the basis of the drawings, but the mounting structures 10 relating to the present embodiments are not limited to the illustrated structures, and the designs thereof can be changed appropriately within a scope that does not depart from the gist of the present disclosure. For example, in the third embodiment, there is a structure in which the weak portions 66 break. Therefore, it suffices for the rear side joining portions 52B to be fixed to the brackets 58, and embodiments are not limited to a structure in which the rear side joining portions 52B are fixed by the bolts 74 and the nuts.

Further, in the first embodiment through the fourth embodiment, the structure of the front side joining portions 52A and the structure of the rear side joining portions 52B may be reversed. Namely, there may be a structure in which, in the first embodiment, the anchor portions 54, which are fit-together with the shaft portions of the bolts 72 from the upper side, are formed at the front side joining portions 52A, and, when load is inputted to the FC stack 20 from the vehicle body front side, these anchor portions 54 dislocate from the shaft portions of the bolts 72, and the front side joining portions 52A break away from the suspension members 30, and, due thereto, the FC stack 20 rotates toward the vehicle body rear side around the bolts 74 that are inserted-through the through-holes of the rear side joining portions 52B.

Further, in the second embodiment, there may be a structure in which the anchor portions 54, which have the weak portions 55 and are fit-together with the shaft portions of the bolts 72 from the lower side, are formed at the front side joining portions 52A, and, when load is inputted to the FC stack 20 from the vehicle body front side, the weak portions 55 of the anchor portions 54 are broken from the upper sides by the shaft portions of the bolts 72, and the front side joining portions 52A break away from the suspension members 30, and, due thereto, the FC stack 20 rotates toward the vehicle body rear side around the bolts 74 that are inserted-through the through-holes of the rear side joining portions 52B.

Moreover, in the third embodiment, there may be a structure in which the upper portions of the front mount main bodies 52 and the front side joining portions 52A that have the anchor portions 54 are connected by the weak portions 66 that are narrow, and, when load that is directed toward the vehicle body front side is inputted to the FC stack 20 due to inertial force, these weak portions 66 break due to concentration of compressive load, and the front side joining portions 52A break away from the suspension members 30, and the FC stack 20 rotates toward the vehicle body front side around the bolts 74 that are inserted-through the through-holes of the rear side joining portions 52B.

Further, in the fourth embodiment, there may be a structure in which the anchor portions 64, which are substantially "U" shaped in a side view and that are fit-together from the upper sides with the shaft portions of the bolts 72 that are inserted-through the through-holes of the front side joining portions 52A, are formed at the upper end portions of the front sides of the brackets 58 and not at the rear sides of the brackets 58, and, as in the first embodiment and the second embodiment, when load is inputted to the FC stack 20 from the vehicle body front side, the shaft portions of the bolts 72 dislocate from the anchor portions 64 of the brackets 58, and the front side joining portions 52A break away from the suspension members 30, and the FC stack 20 rotates toward the vehicle body rear side around the bolts 74 that are inserted-through the through-holes of the rear side joining portions 52B.

Note that the weak portions 55 are not limited to structures that are formed to have a thinner thickness than other regions, and, for example, may be structured by being made to be narrower than other regions, or the like. Further, the anchor portions 54 as well are not limited to structures that are formed in substantial "U" shapes in a side view seen from the vehicle transverse direction, and may be formed in substantial "V" shapes for example.

What is claimed is:

1. A fuel cell mounting structure comprising:
    a pair of left and right vibration-proofing members each including a front side joining portion and a rear side joining portion mounted to suspension members; and
    a fuel cell that is supported at least by the pair of left and right vibration-proofing members, and is disposed at vehicle body upper sides of the suspension members,
    wherein one of the front side joining portion and the rear side joining portion are supported so as to be rotatable with a vehicle transverse direction being an axis of rotation, and
    an other of the front side joining portion and the rear side joining portion are structured so as to break away from the suspension members, due to weak portions breaking at a time when load is inputted to the fuel cell from a vehicle body longitudinal direction.

2. The fuel cell mounting structure of claim 1, wherein the weak portions are formed to have a thickness that is thinner than other regions.

3. The fuel cell mounting structure of claim 1, wherein the pair of left and right vibration-proofing members includes
    front mount main bodies that include the front side joining portion and the rear side joining portion at a lower end portion of the front mount main bodies, and
    a pair of left and right brackets that nip the lower end portion of the front mount main bodies.

4. A fuel cell mounting structure comprising:
    a pair of left and right vibration-proofing members each including a front side joining portion and a rear side joining portion mounted to suspension members; and
    a fuel cell that is supported at least by the pair of left and right vibration-proofing members, and is disposed at vehicle body upper sides of the suspension members, wherein one of the front side joining portion and the rear side joining portion are supported so as to be rotatable with a vehicle transverse direction being an axis of rotation, and an other of the front side joining portion and the rear side joining portion are structured so as to break away from the suspension members, due to anchor portions dislocating at a time when load is inputted to the fuel cell from a vehicle body longitudinal direction.

5. The fuel cell mounting structure of claim 4, wherein the anchor portions are formed in substantial "U" shapes in a side view seen from the vehicle transverse direction.

6. The fuel cell mounting structure of claim 4, wherein the anchor portions are formed in substantial "U" shapes and open toward a vehicle body lower side in a side view seen from the vehicle transverse direction.

7. The fuel cell mounting structure of claim 4, wherein the anchor portions are formed in substantial "U" shapes and open toward a vehicle body upper side in a side view seen from the vehicle transverse direction.

8. The fuel cell mounting structure of claim 4, wherein the pair of left and right vibration-proofing members includes front mount main bodies that include the front side joining portion and the rear side joining portion at a lower end portion of the front mount main bodies, and a pair of left and right brackets that nip the lower end portion of the front mount main bodies.

\* \* \* \* \*